(12) United States Patent
Tersteeg

(10) Patent No.: US 10,676,837 B2
(45) Date of Patent: Jun. 9, 2020

(54) HIGH EDGE CATHODIC EPOXY ELECTROCOAT COMPOSITION

(71) Applicant: Valspar Sourcing, Inc., Minneapolis, MN (US)

(72) Inventor: Jill Tersteeg, Columbia Heights, MN (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 15/498,127

(22) Filed: Apr. 26, 2017

(65) Prior Publication Data
US 2017/0226653 A1    Aug. 10, 2017

Related U.S. Application Data

(63) Continuation of application No. PCT/US2015/057493, filed on Oct. 27, 2015.

(60) Provisional application No. 62/073,367, filed on Oct. 31, 2014.

(51) Int. Cl.
| | |
|---|---|
| B32B 15/092 | (2006.01) |
| B32B 27/20 | (2006.01) |
| B32B 27/26 | (2006.01) |
| B32B 27/38 | (2006.01) |
| C09D 163/00 | (2006.01) |
| C25D 13/04 | (2006.01) |
| C25D 13/22 | (2006.01) |
| C09D 5/08 | (2006.01) |
| C09D 5/44 | (2006.01) |
| C08G 18/24 | (2006.01) |
| C09D 175/04 | (2006.01) |
| C08G 18/80 | (2006.01) |
| C08G 18/64 | (2006.01) |
| C08K 3/36 | (2006.01) |

(52) U.S. Cl.
CPC .......... *C25D 13/04* (2013.01); *C08G 18/242* (2013.01); *C08G 18/643* (2013.01); *C08G 18/80* (2013.01); *C09D 5/08* (2013.01); *C09D 5/443* (2013.01); *C09D 5/4434* (2013.01); *C09D 5/4453* (2013.01); *C09D 163/00* (2013.01); *C09D 175/04* (2013.01); *C25D 13/22* (2013.01); *C08G 2150/90* (2013.01); *C08K 3/36* (2013.01)

(58) Field of Classification Search
None
See application file for complete search history.

(56) References Cited

U.S. PATENT DOCUMENTS

| | | | |
|---|---|---|---|
| 4,889,775 A | 12/1989 | Adaniya et al. | |
| 5,314,594 A | 5/1994 | Chung et al. | |
| 5,804,051 A | 9/1998 | Boyd et al. | |
| 6,015,628 A * | 1/2000 | Urata | B05D 7/51 |
| | | | 428/413 |
| 6,479,103 B1 | 11/2002 | Wichelhaus et al. | |
| 7,625,477 B2 | 12/2009 | Kawaraya et al. | |
| 8,137,804 B2 * | 3/2012 | Terseteeg | C08G 18/8064 |
| | | | 428/329 |
| 8,197,654 B2 | 6/2012 | Hickenboth et al. | |
| 2004/0118695 A1 | 6/2004 | Chung | |
| 2006/0124462 A1 * | 6/2006 | Morishita | C09D 5/4492 |
| | | | 204/504 |
| 2008/0254284 A1 | 10/2008 | Tersteeg | |
| 2010/0270164 A1 * | 10/2010 | Kubota | C25D 5/18 |
| | | | 205/50 |

FOREIGN PATENT DOCUMENTS

| | | |
|---|---|---|
| CN | 1756809 | 4/2006 |
| DE | 19748764 | 5/1999 |
| DE | 102006059123 | 6/2007 |
| EP | 0312599 | 4/1989 |
| EP | 0509437 | 10/1992 |
| EP | 1420086 | 5/2004 |
| WO | 0121718 | 3/2001 |
| WO | 0146319 | 6/2001 |
| WO | 2004078857 | 9/2004 |
| WO | 2011156315 | 12/2011 |

OTHER PUBLICATIONS

Technical Data Sheet for ACEMATT OK412; Evonik. (Year: 2020).*
Technical Data Sheet for ACEMATT OK500; Evonik. (Year: 2020).*
Technical Data Sheet for ACEMATT OK520; Evonik. (Year: 2020).*
International Search Report for International Application No. PCT/US2015/057493, dated Feb. 4, 2016. 3 pages.
International Preliminary Report on Patentability for International Application No. PCT/US2015/057493. 6 pages.
Extended Search Report for European application No. 15856052.4, dated Mar. 5, 2018 (10 pages).
Office Action issued for corresponding Chinese patent application No. 201580058641.5, dated Dec. 27, 2018 (13 pages, including English translation.).

* cited by examiner

*Primary Examiner* — Michael J Feely

(57) ABSTRACT

An electrocoating composition and a coating formed from the composition are described herein. The electrocoating composition includes at least an epoxy resin component, an isocyanate-functional component and a silica-based additive. The coating shows about 40 to 70% reduction in edge corrosion relative to a conventional coating.

8 Claims, 1 Drawing Sheet

HIGH EDGE CATHODIC EPOXY ELECTROCOAT COMPOSITION

CROSS-REFERENCE TO RELATED APPLICATIONS

This application is a continuation of International Application No. PCT/US2015/057493 filed Oct. 27, 2015, which claims priority from U.S. Provisional Application Ser. No. 62/073,367, filed Oct. 31, 2014, each of which is incorporated herein by reference in its entirety.

BACKGROUND OF THE INVENTION

Coatings are typically applied to substrates to provide protective and/or decorative qualities. One effective technique for applying coatings includes an electrocoating process, which typically involves depositing a composition onto an electrically conductive substrate with an applied electrical potential. Early attempts at commercial electrocoating processes used anionic electrocoating processes, where the substrate being coated served as the anode. However, cathodic or cationic electrocoating processes have become increasingly popular, and today, are the most prevalent methods of electrocoating.

One desired property of coatings is corrosion resistance. The use of coatings exhibiting good corrosion resistance prolongs the functionality and performance of the coating composition and the underlying substrate. This is particularly important for coating compositions applied to surfaces or substrates that are used in highly corrosive environments, including, for example, in the heavy machinery industry.

Components or parts in the heavy machinery industry, as well as in other industries, are often laser-cut, stamped or formed, and conventional coatings do not always coat the edges of such metal parts sufficiently to provide optimal corrosion resistance. As a result, these components or parts suffer from edge corrosion and subsequent failure. The heavy machinery industry now attributes more than $250 million in annual claims to corrosion failures, and specifically to edge corrosion.

Accordingly, there is need for an electrocoating composition that exhibits good corrosion resistance, and especially good edge corrosion resistance.

SUMMARY

The present description provides an electrocoating composition and a coating formed from the composition, as well as methods for coating a substrate with the described composition. The composition includes at least an epoxy resin, an isocyanate-functional compound, and a silica-based additive.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the accompanying drawings and the description below. Other features, objects, and advantages of the invention will be apparent from the description and drawings, and from the claims.

SELECTED DEFINITIONS

Figure 1:
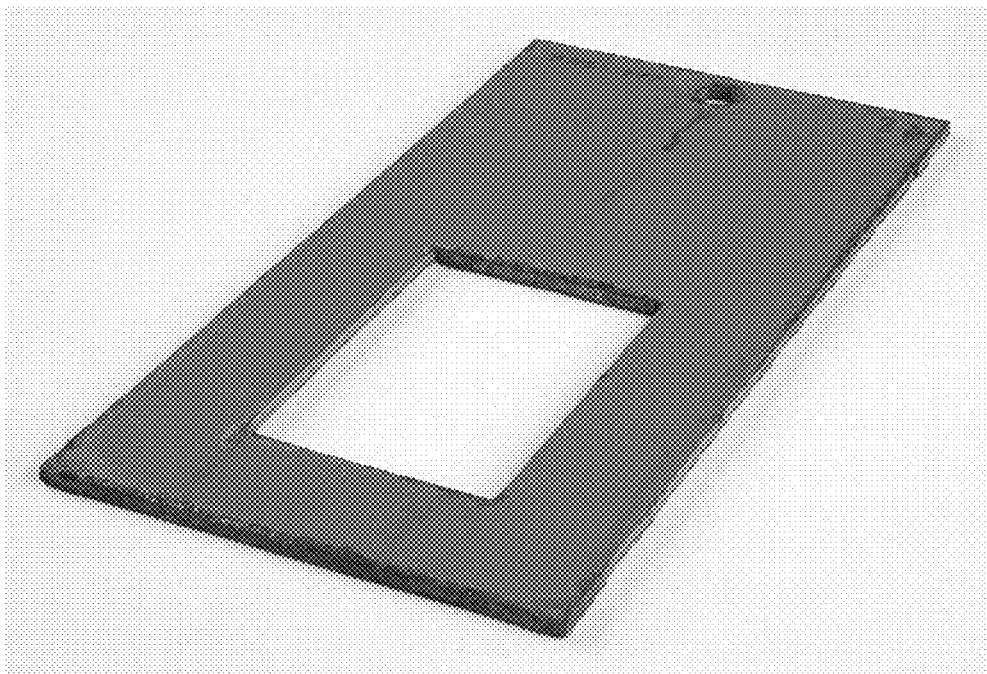
FIG. 1 is a photographic depiction of a view of a laser-cut test panel with a conventional coating applied thereon following 40 cycles of cyclic corrosion testing.

Unless otherwise specified, the following terms as used herein have the meanings as provided below.

The term "epoxy-functional compound," as used herein, refers to an epoxy resin that contains no free epoxy functionality, i.e. there are no epoxy groups that remain unreacted. Curing of such resins occurs when the hydroxyl- or amine-functionality on the epoxy resin reacts with an isocyanate. The term is used interchangeably herein with "epoxy resin."

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In an embodiment, the present description provides a coated article including a substrate with a coating disposed thereon. In an aspect, the coating is formed from an electrocoating composition to protect the substrate from corrosion, particularly edge corrosion. The composition preferably includes at least an epoxy-functional compound, an isocyanate-functional compound, and a silica-based additive. The resulting coated articles shows significant reduction in edge corrosion relative to coated articles with a conventional coating applied thereon.

In an embodiment, the electrocoating composition described herein preferably includes at least an epoxy resin component an isocyanate-functional component. In a preferred aspect, these components crosslink to form the coating. The active hydrogen-containing cationic resin electrodepositable on a cathode, which along with the curing agent constitutes the main vehicle of the electrodepositable composition, may be any suitable cationic resin known to those skilled in the art, but is preferably derived from a polyepoxide. The cationic resin can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The reaction product can then be reacted with a cationic salt forming group to produce the cationic resin. Polyepoxides as used in the methods herein may be prepared by methods known to those of skill in the art.

Suitable epoxy resin compounds include, for example, polyepoxides derived monomers, polymers, and copolymers having at least two epoxy moieties per molecule. The epoxy-functional compound may include molecules that are saturated, unsaturated, branched, unbranched, aliphatic, alicyclic, aromatic, heterocyclic, and combinations thereof. Examples of suitable number average molecular weights ($M_n$) for the epoxy resin compound range from about 200 to about 5,000, with particularly suitable weight average molecular weights ranging from about 300 to about 2,000.

In an embodiment, the epoxy resin compound is a polyglycidyl ether of one or more polyhydric alcohols, where the polyhydric alcohols may also function as chain extenders to modify the molecular weights of the epoxy-functional compound molecules (e.g., via hydroxyl-epoxy reactions). Preferably, the epoxy resin compound is a polyglycidyl ether of one or more cyclic polyhydric alcohols, such as polyhydric phenols, alicyclic polyhydric alcohols, aliphatic polyhydric alcohols (including, for example, simple polyols such as neopentyl glycol, polyester polyols such as those described in U.S. Pat. No. 4,148,772, polyether polyols such as those described in U.S. Pat. No. 4,468,307, and urethane diols such as those described in U.S. Pat. No. 4,931,157), and combinations thereof. The epoxy resin compound may be, for example, a polyglycidyl ether of one or more polyhydric phenols by etherification of the polyhydric phenols with epihalohydrin (e.g., epichlorohydrin) or dihalohydrin (e.g., dichlorohydrin) in the presence of an alkali. Examples of suitable polyhydric phenols for forming the epoxy-functional compound include 2,2-bis-(4-hydroxyphenyl)ethane; 4,4-dihydroxy-2,2-diphenylpropane (i.e., Bisphenol A); 2-methyl-1,1-bis-(4-hydroxyphenyl)-propane; 2,2-bis-(4-hydroxy-3-tertiarybutylphenyl)-propane, 1,1-bis-(4-hydroxyphenol)ethane; bis-(2-hydroxynaphthyl) methane; 1,5-dihydroxy-3-naphthalenel, phloroglucinol, catechol, resorcinol, and combinations thereof. In a preferred aspect, the polyhydric phenol is Bisphenol A.

Examples of suitable alicyclic polyhydric alcohols for forming the epoxy resin compound include 1,2-cyclohexane diol; 1,4-cyclohexane diol; 1,2-bis-(hydroxymethyl)cyclohexane; 1,3-bis-(hydroxymethyl)cyclohexane; and combinations thereof. Examples of suitable aliphatic polyhydric alcohols for forming the epoxy-functional compound include polyols such as ethylene glycols, propylene glycols, 1,3-propanediol, glycerols, diethylene glycols, dipropylene glycols, triethylene glycols, trimethylolpropanes, trimethyloletnanes, tripropylene glycols, neopentyl glycols, pentaerythritols, 1,4-butanediol, trimethylol propanes, hexylene glycols, and combinations thereof.

The molecules of the epoxy-resin compound may also include substituents such as halogen groups, hydroxyl moieties, ether groups, and cationic salt moieties. In one embodiment, the epoxy-functional compound may include one or more amine-based cationic salt moieties derived by reacting the epoxy polymers with amine compounds. Examples of suitable amine compounds for forming the amine-based cationic salt moieties include primary amines, secondary amines, tertiary amines, and combinations thereof. Suitable amines include, for example, ethylamine, methylethylamine, triethylamine, N-benzyldimethylamine, dicocoamine and N,N-dimethylcyclohexylamine. Also, dimethylaminopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, alkanolamines such as methylethanolamine, aminoethylethanolamine, aminopropylmonomethylethanolamine, and diethanolamine, diketimine. Primary amines and secondary amines can be acidified after reaction with the epoxy moieties to form amine salt moieties. Tertiary amines can be acidified prior to reaction with the epoxy moieties and, after reaction with the epoxy moieties, form quaternary ammonium salt moieties. The amine-based cationic salt moieties may be beneficial for increasing the crosslinking density when reacted with the isocyanate-functional compound.

In one embodiment, the amine compounds may be hydroxyl-containing amines. Examples of suitable hydroxyl-containing amines include alkanol amines, dialkanol amines, trialkanol amines, alkyl alkanol amines, arylalkanol amines, arylalkylalkanolamines, and combinations thereof. Specific examples of suitable hydroxyl-containing amines include ethanolamine, N-methylethanolamine, diethanolamine, N-phenylethanolamine, N,N-dimethylethanolamine, N-methyldiethanolamine, triethanolamine, and N-(2-hydroxyethyl)-piperazine.

In an embodiment, the electrocoating composition described herein preferably includes at least an epoxy-functional component an isocyanate-functional component. In a preferred aspect, these components crosslink to form the coating, where the isocyanate-functional component functions as a crosslinking agent. Suitable isocyanate-functional components include, for example, aliphatic isocyanates, cycloaliphatic isocyanates, aromatic isocyanates, and combinations thereof. The isocyanate-functional may include one or more isocyanate moieties, and preferably includes two or more isocyanate moieties (e.g., diisocyanates). Examples of specific suitable compounds for the isocyanate-functional compound include tetramethylene diisocyanates, hexamethylene diisocyanates, cyclohexamethylene methylene cyclohexyl isocyanates, isophorone diisocyanates, diisocyanates, toluene diisocyanates, methylene diphenyl diisocyanates, methylene diphenyl diisocyanates, phenylene diisocyanates, and combinations thereof.

In one embodiment, the isocyanate-functional compound may be at least partially blocked with a blocking agent. Preferably, the isocyanate-functional compound is fully blocked with a blocking agent such that substantially no free isocyanate moieties are available until exposed to high temperatures during a curing process. In an aspect, the isocyanate-functional compound is a polyisocyanate. Suitable polyisocyanates also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

Suitable combined concentrations of the epoxy-functional compound and the isocyanate-functional compound in the electrocoating composition range from about 50% by weight to about 90% by weight, with particularly suitable combined concentrations ranging from about 70% by weight to about 80% by weight, based on the total solids weight of the electrocoating composition. As used herein, the term "total solids weight" refers to the total weight of the non-aqueous or solvent-based components (e.g., water). Suitable concentrations of the isocyanate-functional compound may be based on the ratio of isocyanate moieties of the isocyanate-functional compound to epoxy moieties of the epoxy-functional compound. Examples of suitable ratios range from about 0.5 equivalents of the isocyanate moiety per equivalent of epoxy moiety to about 5 equivalents of the isocyanate moiety per equivalent of epoxy moiety, with particularly suitable ratios ranging from about 1 equivalent of the isocyanate moiety per equivalent of epoxy moiety to about 3 equivalents of the isocyanate moiety per equivalent of epoxy moiety.

In one embodiment, the epoxy-functional compound and the isocyanate-functional compound may be provided as a pre-combined resin. Examples of suitable pre-combined resins of epoxy-functional compounds and isocyanate-functional compounds include resins commercially available under the trademarks "VECTROGARD® 950" clear dispersion from Valspar Corporation, Minneapolis, Minn., a cathodic epoxy resin mixture of amine-extended Bisphenol A epoxy resins and an alcohol blocked aromatic crosslinker.

In one embodiment, the electrocoating composition also preferably includes a catalyst to assist the crosslinking of the epoxy-functional compound and the isocyanate-functional compound. Suitable catalysts for use in the electrocoating composition include, for example, metal catalysts, such as tin-containing compounds (e.g., dioctyltin oxide and dibutyltin oxide) or bismuth compound. In another aspect, the catalyst is a metal-free catalyst, i.e. a catalyst that does not include tin, lead, bismuth and/or other heavy metal-based compounds. Suitable concentrations of the catalyst in the electrocoating composition range from about 0.1% by weight to about 5.0% by weight, with suitable concentrations ranging from about preferably 0.5% by weight to about 3.0% by weight, more preferably from about 1.0% to about 2.0% by weight, based on the total solids weight of the electrocoating composition.

As described above, the electrocoating composition herein preferably includes at least an epoxy-functional compound (i.e. an amine-functional epoxy resin), an isocyanate-functional compound, and a silica-based additive. The term "silica-based additive," as used herein, refers to one or more agents that may be used in the electrocoat composition to impart desired properties to the coating formed from the composition. Although the term "silica-based" is used, the additives are not limited to silica or additives derived from silica. Suitable additives include, for example, silica, clay, talc, barytes, calcium carbonate, barium sulfate, aluminum silicate, potassium aluminum silicate, magnesium silicate, and the like, or combinations and mixtures thereof. The silica-based additive may be in a variety of forms, i.e. treated or untreated. The additive may be in a variety of particle sizes. Any combination of form and/or particle size may be used for the additive.

The amount of the silica-based additive present in the composition described herein varies depending on the desired properties of the coating formed from the composition. In a preferred aspect, the amount of the additive is sufficient to provide optimal edge protection and a significant reduction in edge corrosion when the electrocoating composition is applied to a metal substrate. In certain embodiments, the additive is present in an amount from about 0.1 to 95 wt %, preferably 0.5 to 50 wt %, more preferably, 1 to 10 wt %, based on the total weight of solids in the composition.

In a preferred embodiment, the additive is silica. The form of silica is not limited and may be, without limitation, crystalline, amorphous, precipitated, or combinations or mixtures thereof. The silica may be treated, untreated, or combinations or mixtures thereof. The particle size of the silica is similarly not limited, and different particle sizes may be chosen depending on the desired properties of the coating. Suitable examples of silica include, for example, silica varieties commercially available as ACEMATT® (Evonik Industries AG), including OK412, OK412LC, OK500, OK520, and the like. In an aspect, the silica-based additive may include any combination of various types of silica in various different particle sizes.

In various embodiments, the electrocoating compositions may also include one or more additional components, such as film-forming agents (including solvents used to dissolve and/or disperse the coating composition that ultimately aid in film formation), surfactants, wetting agents, defoaming agents, rheology-modifying agents, colorants (e.g., pigments and dyes), and combinations thereof.

Examples of suitable surfactants and wetting agents include alkyl imidazolines, such as those commercially available under the trademark "GEIGY AMINE C®" surfactants (Ciba Specialty Chemicals); acetylenic alcohols, such as those commercially available under the trademark "SURFYNOL®" surfactants (commercially available from Air Products), and combinations thereof. Examples of suitable defoaming agents include the above-discussed surfactants and wetting agents, polysiloxane defoamers (e.g., methylalkylpolysiloxanes), and combinations thereof. Suitable concentrations of surfactants, wetting agents, and defoaming agents in the electrocoating composition range from about 0.1% by weight to about 2.0% by weight, with particularly suitable concentrations ranging from about 0.1% by weight to about 0.5% by weight, based on the total solids weight of the electrocoating composition.

Examples of suitable rheology-modifying agents include thixotropic materials and fillers. Examples of suitable thixotropic materials include polyamides, oxidized polyethylenes, and combinations thereof. Examples of suitable commercially available thixotropic materials include those under the series "DISPARLON®" (King Industries, Inc., Norwalk, Conn.). Examples of suitable fillers include silicon dioxides, talc, wollastonites, mica, alumina trihydrates, clays, silica quartz, calcium carbonates, magnesium carbonates, barium carbonates, calcium sulfates, magnesium sulfates, and combinations thereof. Examples of suitable commercially available fillers include silicon dioxides under the trademark "AEROSIL®" (Evonik Industries AG), and silica quartz fillers under the series "BENTONE®" (Elementis-Specialties, Inc.). Suitable concentrations of rheology-modifying agents in the electrocoating composition range from about 0.01% by weight to about 0.20% by weight, with particularly suitable concentrations ranging from about 0.01% by weight to about 0.1% by weight, based on the total solids weight of the electrocoating composition.

Examples of suitable colorants for use in the electrocoating composition include pigments, such as iron oxides, lead oxides, zinc oxides, strontium chromate, copper chromium, carbon black, coal dust, titanium dioxide, lead silicate, barium sulfate, and combinations thereof. Examples of commercially available carbon black pigments include those under the trademark "PRINTEX®" carbon black (Evonik). In one embodiment, the electrocoating composition may also include one or more flattener pigments, such as those commercially available under the trademark "Suitable concentrations of pigments and other colorants (e.g., dyes) in the electrocoating composition range from about 1.0% by weight to about 10.0% by weight, with particularly suitable concentrations ranging from about 2.0% by weight to about 5.0% by weight, based on the total solids weight of the electrocoating composition. The electrocoating composition may also include one or more monomeric or polymeric compounds, such as acrylic resins, to modify the color of the resulting coating.

The present description includes a suitable method for forming a coated article with the electrocoating composition described herein via a cathodic electrocoating process. In an embodiment, the electrocoating composition may be provided as a two-part system, which preferably includes a pigment paste part and a resin part. Accordingly, the method described herein initially includes forming a pigment paste part of the electrocoating composition. The pigment paste part preferably includes at least the silica-based additive. Additionally, the pigment paste part may include any of the above-discussed additional components (e.g., surfactants, pigments, and the like). In an embodiment, the pigment paste part may also include a portion of the epoxy-functional compound and the isocyanate-functional compound, which desirably assists in dispersing the components of the pigment paste part (e.g., the silica-based additive, surfactants, pigments, and the like).

In one embodiment, the electrocoating composition may also include one or more acid compounds, which may be beneficial for further neutralizing the epoxy-functional compound, i.e. an amine-functional epoxy resin. In one embodiment, the epoxy-functional compound may be at least about 35% neutralized, with particularly suitable levels of neutralization ranging from about 35% to about 60%. The neutralization of the epoxy-functional compound renders the epoxy-functional compound cationic and water dispersible. Examples of suitable acid compounds include organic and inorganic acids such as formic acid, acetic acid, lactic acid, phosphoric acid, sulfamic acid, sulfonic acids, and combinations thereof. Suitable concentrations of the acid compound in the electrocoating composition range from about 0.1% by weight to about 2.0% by weight, with particularly suitable concentrations ranging from about 0.2% by weight to about 1.0% by weight, based on the total solids weight of the electrocoating composition.

The pigment paste part may be prepared by mixing the components (e.g., the silica-based additive, catalyst, pigment, and the like) together to form a paste. The pigment paste part may also include water to assist in the mixing of the components. The components may be mixed together with a variety of mixing systems, such as media mills and high-speed dispersers. The mixing desirably continues at least until the components are well mixed, thereby dispersing the components, including the silica-based additive, through the pigment paste part. The pigment paste part may then be combined with a resin part to form the electrocoating composition. The resin part desirably includes at least a portion of the crosslinkable components of the electrocoating composition, such as the epoxy-functional compound and the isocyanate-functional compound. In one embodiment, the resin part may also include one or more of the above-discussed additional components. The pigment paste part and the resin part are desirably combined in a reaction vessel containing an aqueous medium (e.g., deionized water). This desirably allows the pigment paste part and the resin part to mix and become suspended (e.g., dispersed, solubilized, and/or emulsified) in the aqueous medium.

As discussed above, the pigment paste part may include an acid component that desirably neutralizes the epoxy-functional compound (i.e. an amine-functional epoxy resin) provided from the resin part and/or the pigment paste part, thereby desirably rendering the epoxy-functional compound water soluble. As such, the electrocoating composition may be dispersed in the aqueous medium to desirably form a stable aqueous dispersion in the aqueous medium. As used herein, the term "stable aqueous dispersion" refers to a dispersion that does not settle out of the aqueous medium for a duration of at least 30 minutes without agitation. The dispersion is also desirably re-dispersible with the use of mild agitation. In one embodiment, the electrocoating composition may be capable of forming stable aqueous dispersion in an aqueous medium at a total solids concentration of about 20% by weight or less, based on an entire weight of the aqueous dispersion. An aqueous dispersion is beneficial in an electrocoating process for allowing the electrocoating composition to migrate toward a cathodic substrate when an electrical potential is induced through the aqueous dispersion.

Suitable feed ratios by weight of the pigment paste part, the resin part, and the aqueous medium range from about 1:2:10 (i.e., 1 pigment paste part, 2 resin parts, 10 aqueous medium parts, by weight) to about 1:5:20. Suitable solid ratios in the aqueous dispersion range from about 5% by weight to about 20% by weight, with particularly solid ratios in the dispersion ranging from about 8% by weight to about 15% by weight. The aqueous dispersion may be kept under agitation in the reaction vessel to reduce the risk of settling, and may also be maintained at an elevated temperature to assist the electrocoating process. Examples of suitable elevated temperatures range from about 27° C. (80° F.) to about 43° C. (110° F.), with particularly suitable elevated temperatures ranging from about 32° C. (90° F.) to about 35° C. (95° F.).

A substrate may then be subjected to an electrocoating process in the reaction vessel to form a coating on the substrate. This may involve placing an electrically conductive anode in contact with the aqueous dispersion. The substrate may then be immersed in the aqueous dispersion and connected to an electrically conductive carrier, thereby allowing the substrate to function as a cathode. An electrical potential may then be induced through the aqueous dispersion and the substrate, thereby depositing the electrocoating composition onto the substrate. The electrocoating process may be performed for a duration sufficient to build a coating of the electrocoating composition to a desired thickness on the substrate. The thickness of the coating may depend on a variety of factors, such as the composition of the electrocoating composition, the solids concentration of the aqueous dispersion, the surface area of the substrate, and the intensity of the electrical potential. Examples of suitable electrical potentials range from about 50 volts to about 500 volts, with particularly suitable electrical potentials ranging from about 100 volts to about 350 volts.

After the electrocoating process, the coated substrate may be rinsed to desirably remove any non-bonded portions of the electrocoating composition. Examples of suitable rinsing fluids include deionized water and/or a permeate filtered from the reaction vessel, which may include water, acid, solvent, ions, and low molecular weight resins. The coated substrate may then be heated to cure the coating. In one embodiment, the coated substrate may be placed in an oven maintained at an elevated temperature for a sufficient duration to cure the coating. The temperature is preferably high enough to remove the blocking agent from the isocyanate-functional compound, thereby allowing the epoxy-functional compound to crosslink with the isocyanate-functional compound. Examples of suitable temperatures for curing the electrocoating composition range from about 150° C. (about 300° F.) to about 200° C. (about 400° F.), with particularly suitable temperatures ranging from about 175° C. (about 350° F.) to about 190° C. (about 380° F.). Examples of suitable durations for substantially curing the coating at the suitable and particularly suitable temperatures range from about 10 minutes to about 60 minutes, with particularly suitable durations ranging from about 15 minutes to about 30 minutes.

In one embodiment, the electrocoating process may be performed in a continuous manner, where successive portions of the substrate may be run into, and out from, the reaction vessel during the electrocoating process. In this embodiment, the pigment paste part, the resin part, and the aqueous medium may be continuously or intermittently charged to the reaction vessel to maintain a desired concentration ratio. The successive portions of the substrate preferably have sufficient dwell times in the reaction vessel to form coatings having desired thicknesses. Examples of suitable dwell times for continuous electrocoating processes using the above-discussed operating conditions range from about 60 seconds to about 180 seconds, with particularly suitable dwell times ranging from about 90 seconds to about 120 seconds. Furthermore, the rinsing and curing steps may also be performed in a continuous manner in a single assembly line, thereby reducing the time to form the coated articles.

The resulting coated article desirably includes a coating that provides excellent corrosion protection, particularly at the edges of the substrate, or in sharp areas produced by laser-cutting and/or other manufacturing processes. Without limiting to theory, the silica-based additive controls the flow of the electrocoat composition and allows the coating to not flow away from the edge, relative to conventional coating compositions. The coating formed with the electrocoating composition containing the silica-based additive shows significant improvement in edge corrosion. In an aspect, an article coated with the electrocoating composition described herein shows a 40% reduction in edge corrosion, preferably a 50% reduction, more preferably a 70% reduction in edge corrosion relative to an article coated with a conventional electrocoating composition (i.e. one that does not contain the silica-based additive).

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts, ratios and percentages are by weight and all molecular weights are weight average molecular weight. Unless otherwise specified, all chemicals used were obtained, or are commercially available from the suppliers described below, or may be synthesized by conventional methods. The following compositional abbreviations are used in the following Examples:

"Epoxy resin": a cathodic epoxy resin mixture of amine-extended Bisphenol A epoxy resins and an alcohol blocked aromatic urethane crosslinker commercially available as VECTROGARD® 950 clear dispersion from Valspar Corporation.

"Epoxy salt": an amino-extended Bisphenol A epoxy resin available from Valspar Corporation.

"Silica-based additive": a fine-grained after-treatment precipitated silica commercially available as ACEMATT® OK412 from Evonik Industries AG.

"Tin catalyst": a dibutyltin oxide catalyst commercially available as FASCAT®4203 catalyst from Arkema.

"104-A surfactant": a wetting agent surfactant and defoamer commercially available as SURFYNOL®104-A from Air Products and Chemicals.

"Synfac 8009 surfactant": a wetting agent surfactant commercially available from Milliken Chemical.

"EEH solvent": ethylene glycol 2-ethylhexyl ether, a solvent commercially available from Eastman.

"Solsperse 41000": a dispersing agent commercially available from Lubrizol.

"Silicon dioxide": $SiO_2$ particulates commercially available as AEROSIL®R-972 silicon dioxide from Evonik.

"Raven® 850": a carbon black pigment commercially available from Columbia Chemicals.

"Tioxide® TR93": a white pigment commercially available from Hunstman.

Coated articles of Example 1 and Comparative Example A were each prepared by forming coatings on steel substrates with electrocoating compositions, and then subjected to cyclic corrosion testing as indicated below.

Test Methods

Unless indicated otherwise, the following test methods were utilized in the Examples that follow.
Laboratory Cyclic Corrosion Test
Cyclic corrosion is tested using a standard method, i.e. the Society of Automotive Engineers (SAE) Surface Vehicle Standard J2334 Cosmetic Corrosion Lab Test. This test is cyclic in nature, i.e.; test specimens are exposed to changing climates over time. As used herein, test specimens are subjected to 40 repeating cycles of exposure to water/humidity, salt spray and air drying at temperatures provided in the test method.

Example 1: Preparation of the Electrocoating Composition (Inventive Example)

The electrocoating composition used to form a coated article was prepared as a two-part system including a pigment paste part and a resin part. The pigment paste part was formed by mixing various components in the amounts shown in Table 1 to form an intermediary grind paste. The grind paste was mixed with a high speed dispenser and put through a media mill to disperse the solid material.

TABLE 1

| Grind paste component | Amount (wt %) |
| --- | --- |
| Epoxy salt | 17.3 |
| 104-A surfactant | 0.25 |
| Lactic Acid | 2.6 |
| DI Water | 41.3 |
| Tin catalyst | 3.04 |
| Dispersant | 3.02 |
| Carbon Black | 0.7 |
| Titanium Dioxide | 24.5 |
| Silica-based additive | 6.5 |
| Film forming agent | 0.8 |

After the grind paste was prepared, the pigment paste part of the composition was prepared by mixing the grind paste with solvent and deionized water. Table 2 lists the resulting component concentrations of the pigment paste part of the electrocoating composition.

TABLE 2

| Pigment paste components | Amount (wt %) |
| --- | --- |
| Epoxy salt | 14.6 |
| 104-A surfactant | 0.2 |
| Lactic Acid | 2.2 |
| DI Water | 47.2 |
| Tin catalyst | 2.6 |
| Dispersant | 2.5 |
| Carbon Black | 0.6 |
| Titanium Dioxide | 20.7 |
| Silica-based additive | 5.5 |
| Film-forming agent | 0.6 |
| Solvent | 3.4 |

The pigment paste part, the resin part, and deionized water were then charged to a reaction vessel to maintain concentration ratios of about 7.4 parts by weight pigment paste part, 20.3 parts by weight resin part, and 72.3 parts by weight deionized water. This provided an aqueous dispersion of the electrocoating composition having a total solids concentration of about 10% by weight. Table 3 lists the component concentrations of the electrocoating composition, based on a total solids weight.

TABLE 3

| Electrocoating composition components | Amount (wt %) |
| --- | --- |
| Epoxy salt | 1.08 |
| 104-A surfactant | 0.02 |
| Lactic Acid | 0.16 |
| Tin catalyst | 0.19 |
| Dispersant | 0.19 |
| Carbon Black | 0.04 |
| Titanium Dioxide | 1.54 |
| Silica-based additive | 0.41 |
| Film forming agent | 0.05 |
| Solvent | 0.25 |
| Epoxy resin | 20.32 |
| DI Water | 75.77 |

The aqueous dispersion was maintained at a temperature ranging from 32° C. (90° F.) to 35° C. (95° F.), and was kept under sufficient agitation in the reaction vessel to keep the solids dispersed in the aqueous medium. A cathodic electrocoating process was then performed by placing an electrically conductive anode in contact with the aqueous dispersion. A steel substrate was then immersed in the aqueous dispersion, and was connected to an electrically conductive carrier to function as a cathode. An electric current of 100 volts was then induced through the aqueous dispersion and the steel substrate, thereby depositing the electrocoating composition onto the steel substrate. The electrocoating process was performed for sufficient duration to build a coating of the electrocoating composition of desired thickness. After completion, the coated substrate was rinsed with deionized water and permeate, and then placed in an oven maintained at 185° C. (365° F.) for 20 minutes to cure the coating. This provided the coated article of Example 1, where the coating included a polyethylene wax and aluminum oxide dispersed within the crosslinked matrix.

Example 2: Preparation of the Electrocoating Composition (Comparative Example)

The electrocoating composition used to form the coated article of Example 2 was prepared as a two-part system in a similar manner to that discussed above for the coated article of Example 1. However, the grind paste prepared for the electrocoating composition for Example 2 did not include the silica-based additive. Thus, the resulting coating on the substrate for the coated article of Comparative Example A did not include the silica-based additive in the crosslinked matrix.

Example 3: Corrosion Testing

The corrosion resistance, specifically edge corrosion resistance, of the coated articles from Examples 1 and 2 was measured. Test panels made of cold rolled steel and measuring 4 in.×8 in. were prepared with a laser-cut insert. The panels were pretreated with iron phosphate and a deionized water rinse and then electrocoated with the inventive composition of Example 1 or the comparative composition of Example 2, according to the process described above. The corrosion resistance of the coatings was then assessed by exposing the panels to a corrosive environment according to the procedure described in the SAE J2334 cyclic corrosion test procedure. The extent of corrosion of each test panel is then measured.

Figure 2:
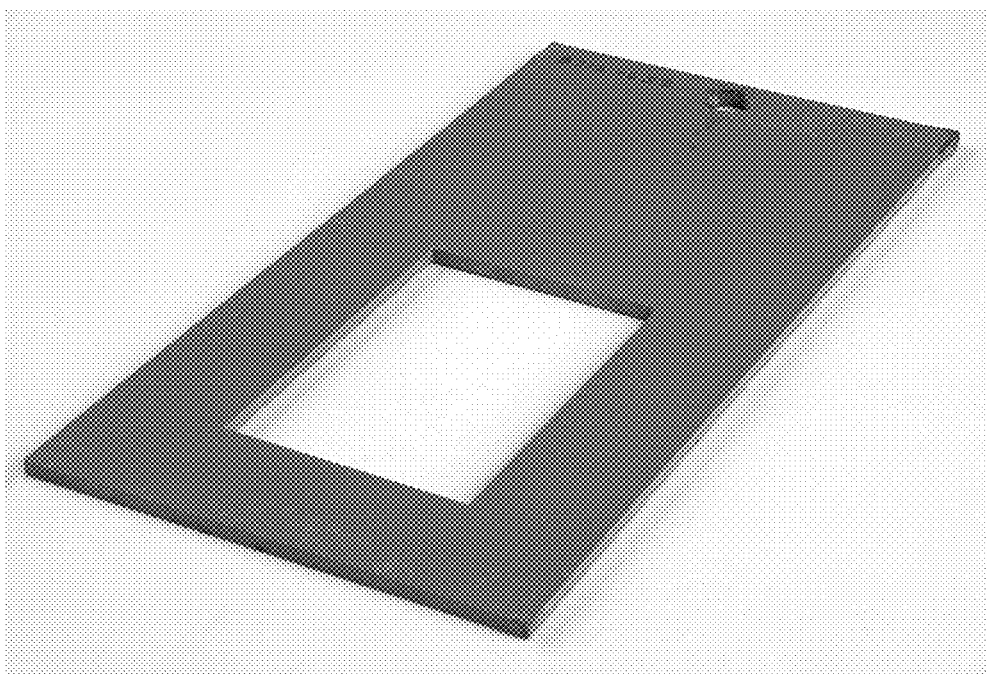
FIG. 2 is a photographic depiction of a view of a laser-cut test panel with the inventive coating applied thereon following 40 cycles of cyclic corrosion testing.

As shown in FIG. 1, the coated article of Example 1 showed significantly less corrosion, including edge corrosion (only about 10% edge corrosion) relative to the coated article of Example 2 as shown in FIG. 2 (about 80% edge corrosion). Accordingly, the electrocoating composition including the silica-based additive was capable of obtaining good edge corrosion resistance and significantly improved edge corrosion resistance relative to an electrocoating composition that does not contain the silica-based additive.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:
1. A coated article, comprising:
a cold-rolled steel substrate with sharp areas produced by laser cutting;
a coating disposed on the substrate, wherein the coating comprises an electrocoat composition comprising an epoxy-functional compound;
an isocyanate-functional compound;
a dibutyl tin oxide catalyst; and
a wax after-treated precipitated silica, wherein the coated article shows about 40 to 70% reduction in edge corrosion according to SAE J2334 cyclic corrosion test procedure relative to a coated article with a coating applied thereon that does not include the after-treated precipitated silica.

2. The coated article of claim 1, wherein the epoxy-functional compound is an amino-based cationic salt moiety formed from an amine compound selected from primary amines, secondary amines, tertiary amines, and combinations thereof.

3. The article of claim 1, wherein the isocyanate-functional compound is a blocked isocyanate.

4. The coated article of claim 1, further comprising one or more components selected from pigments, film-forming agents, surfactants, wetting agents, defoaming agents, rheology-modifying agents, colorants, or combinations thereof.

5. The coated article of claim 1, wherein the after-treated precipitated silica is present in an amount of about 1 to 30 wt %, based on the total weight of solids in the coating composition.

6. The coated article of claim 1, wherein the coating composition comprises: a resin part comprising the epoxy-functional compound and the isocyanate-functional compound; and a paste part comprising at least the silica-based additive.

7. The coated article of claim 6, wherein the coating composition comprises a ratio of the paste part to the resin part from about 1:2 to about 1:5.

8. A method of making the coated article of claim 1, the method comprising: depositing the coating composition onto the substrate with a cathodic electrocoating process; and at least partially crosslinking the epoxy-functional compound and the isocyanate-functional compound.

\* \* \* \* \*